US006639934B1

United States Patent
Engström et al.

(10) Patent No.: US 6,639,934 B1
(45) Date of Patent: Oct. 28, 2003

(54) POWER CONTROL IN A CDMA MOBILE COMMUNICATION SYSTEM

(75) Inventors: Bo Engström, Luleå (SE); Mårten Ericson, Luleå (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 09/300,079

(22) Filed: Apr. 26, 1999

(51) Int. Cl.[7] .................................................. H04B 1/69
(52) U.S. Cl. ........................................................ 375/130
(58) Field of Search ................................ 375/130, 147, 375/358, 135; 370/335, 342, 441; 455/232, 240.1, 245.1

(56) References Cited

U.S. PATENT DOCUMENTS

| | | | | |
|---|---|---|---|---|
| 5,727,033 A | * | 3/1998 | Weaver et al. | ............... 375/375 |
| 5,774,785 A | | 6/1998 | Karlsson | .................... 455/522 |
| 6,414,946 B1 | * | 7/2002 | Satou et al. | ................ 370/328 |

FOREIGN PATENT DOCUMENTS

| | | | |
|---|---|---|---|
| EP | 0 709 973 A | 5/1996 | |
| EP | 0 715 423 A | 6/1996 | |
| EP | 0715423 | * 6/1996 | ........... H04B/7/005 |
| WO | WO 98/58461 | 12/1998 | |

OTHER PUBLICATIONS

Standard Search Report for RS 103031US Completed Jan. 28, 2000, Feb. 2, 2000, EPO.

* cited by examiner

Primary Examiner—Chi Pham
Assistant Examiner—Kevin M Burd (57) ABSTRACT

A transmission power control method and system are provided for use in a spread spectrum or CDMA mobile communications system, whereby an estimate of the achieved SIR is used as an additional parameter for the outer power control loop function. When the QoS and achieved SIR are both too low, the QoS is ignored and the SIR target value is instead controlled by the achieved SIR. Similarly, when both the QoS and achieved SIR are too high, the QoS is ignored and the SIR target value is instead controlled by the achieved SIR.

38 Claims, 5 Drawing Sheets

POWER CONTROL IN A CDMA MOBILE COMMUNICATION SYSTEM

BACKGROUND OF THE INVENTION

1. Technical Field of the Invention

The present invention relates in general to the mobile communications field and, in particular, to a method for controlling transmission power levels in a spread spectrum or Code Division Multiple Access (CDMA) cellular communication system.

2. Description of Related Art

In wideband spread spectrum cellular communication systems (often referred to as Wideband-CDMA or WCDMA systems), power control symbols are transmitted on a regular basis in order to compensate for the effects of changing conditions that influence the channel, such as fading and shadowing. For example, a base station can transmit a power control command which signals a served mobile station to increase or decrease its transmission power level. The mobile station can then decide whether to increase or decrease its transmission power level in response to the power control command received.

As such, it is important that the power control algorithms used in CDMA systems be designed to maintain the negotiated quality of the data channels for all active users. Essentially, the basic power control algorithms used in existing systems are designed to implement this capability in each connection, with two nested control loops. The outer (slower) power control loop controls a transmit signal-to-interference ratio (SIR) or signal-to-noise ratio (SNR) target value for use in the inner (faster) closed power control loop so that the actual Quality of Service (QoS) is close to the negotiated QoS. The inner power control loop estimates the SIR of the forward transmission channel, compares the estimated SIR to the SIR target value, and based on the results of the comparison, transmits power control commands on the reverse transmission channel which "advise" the transmitter on the forward channel about whether to increase or decrease its transmission power level. Typically, the same power control principle can be applied for both the uplink and downlink transmissions.

The conventional inner power control loops are designed to function based on SIR measurements that can be obtained (typically for WCDMA systems) at a rate of 1600 per second. The conventional outer power control loops are designed to function based on QoS values that can be obtained at a typical rate of one per second. Typically, is these QoS values are expressed in terms of a frame error rate (FER), bit error rate (BER), packet delay, or speech quality index (SQI). As such, these QoS values can be obtained only at the above-described rate of once per second, or once per code block (typically, 50 to 100 times per second). However, these QoS values should be accumulated over a significant period of time in order to produce statistically reliable results.

Figure 1A:
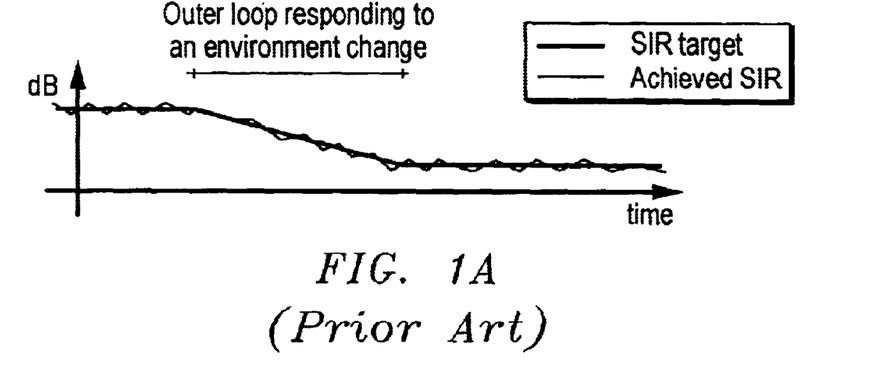
FIGS. 1A and 1B are related diagrams that illustrate how an existing outer power control loop can respond by varying the SIR target value, to a change in the channel environment or to a known service change, respectively.
Figure 1B:
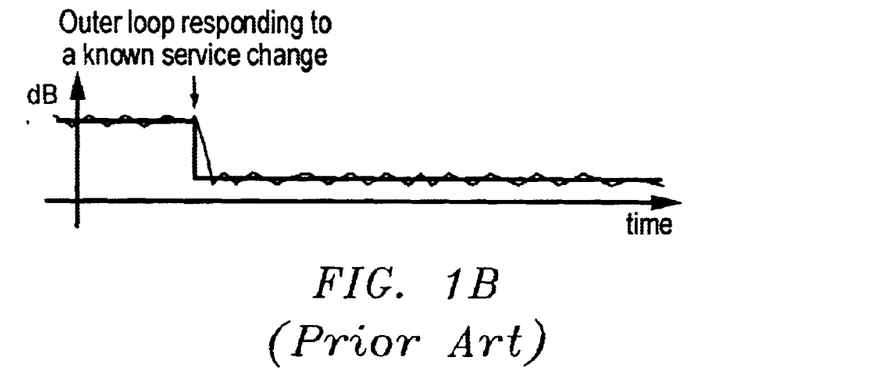

The existing outer power control loops can change a SIR target value faster when an appropriate change is known due to a change of service (e.g., when the transmission data rate is changed). In this regard, FIGS. 1A and 1B are related diagrams that illustrate how an existing outer power control loop can respond (by varying the SIR target value) to a change in the channel environment or to a known service change, respectively. As such, for a properly designed power control implementation, the outer power control loop should be unable to vary the SIR target value any faster than the inner power control loop can respond and change the actual SIR. This approach ensures that the actual SIR follows the SIR target value quite closely all of the time.

A significant problem occurs when the above-described power control approaches are being used. For a number of different reasons, the inner power control loop may be unable to achieve the SIR target value as quickly as the outer power control loop can change the SIR target value. This problem can be caused by limitations on the control loop's bandwidth or on the transmitter's output power range. A reason for this problem is that the outer power control loop in use may be modified to utilize parameters other than QoS values to estimate the QoS and follow the negotiated QoS at a higher rate. For example, the parameters used may be the mean and standard deviation of the raw BER for a number of code blocks, or a characterization of the type of transmission channel involved. Also, the level of interference in the transmission channel can be due to discontinuous data or abrupt variations in speech transmissions. As such, the combined effects of an outer control loop that is faster than the inner loop, along with a rapidly varying transmission channel, can cause a significant difference between the SIR target value and the SIR actually achieved in the channel.

Another reason that an inner power control loop may be unable to achieve a SIR target value is related to the interaction between the power control function and other system management functions (e.g., admission control and congestion control). For example, on the downlink, a base station transmitter might be required to limit its output power level because of an overload or congestion situation. Similarly, the system manager may desire to change the total amount of data being transmitted, as a result of granting access to a new user or changing user data rates.

As a consequence of the above-described problems, the existing inner power control loops are unable to maintain the actual SIR at the desired SIR target value, and the outer power control loop will try to compensate for that inability by further increasing the SIR target value. However, when these circumstances are different, either because the inner loop has achieved an actual SIR that satisfies the negotiated QoS, or the system is successful in reducing the load, the SIR target will already be changed beyond the appropriate value. Under these circumstances, the inner power control loop drives the power level on the forward channel toward this "false" target value until it is properly adjusted to by the outer power control loop. As such, this over-control condition can result in oscillations around the SIR and an unnecessarily high system load.

Figure 2:
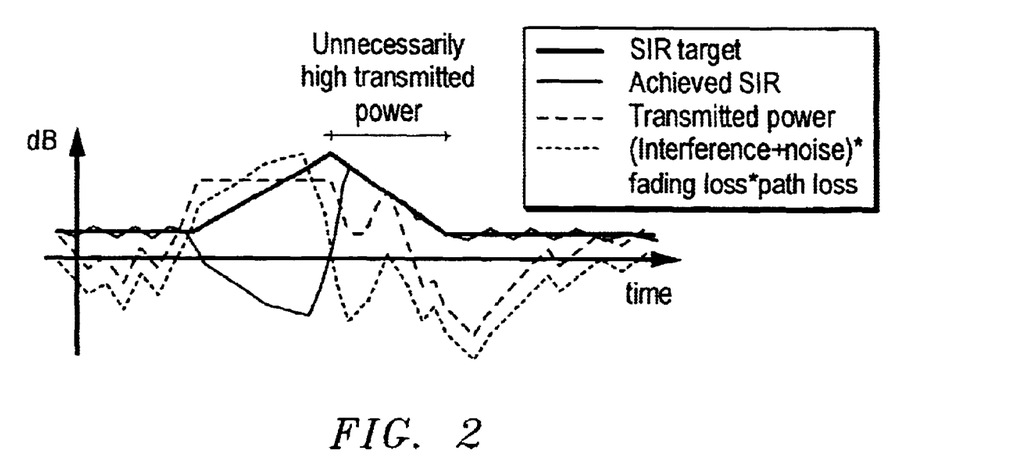
FIG. 2 is a diagram that illustrates over-control oscillations and a high system load for an existing power control loop where the SIR target is being controlled by QoS parameters only.

FIG. 2 is a diagram that illustrates such over-control oscillations and a high system load where the SIR target is being controlled by QoS parameters only. As shown in FIG. 2, the SIR target value is changed when the QoS is out of range, and the negotiated QoS is not achievable when the transmitted power is limited. Nevertheless, as described in detail below, the present invention successfully resolves these and other related problems.

SUMMARY OF THE INVENTION

In accordance with a preferred embodiment of the present invention, a transmission power control method and system are provided for use in a spread spectrum or CDMA mobile communications system whereby an estimate of the achieved SIR is used as an additional parameter for the outer power control loop function. When the QoS and achieved SIR are both too low, the QoS is ignored and the SIR target value is instead controlled by the achieved SIR. Similarly, when both the QoS and achieved SIR are too high, the QoS is ignored and the SIR target value is instead controlled by the achieved SIR.

An important technical advantage of the present invention is that it is possible to increase the adaptation rate of an outer power control loop without the risk of unbounded oscillations in the SIR target due to transmitter power limitations.

Another important technical advantage of the present invention is that the power control method and system are fully contained at the nodes of the communication network and no additional signalling is needed.

Still another important technical advantage of the present invention is that the power control method and system ensure that each mobile station will request a slow increase of the base station's transmit power after a congestion situation, which prevents a rapid increase of the total transmitted power, and therefore, can prevent yet another congestion situation from occurring.

As such, one objective of the present invention is to provide a power control scheme which completely suppresses the above-described drawbacks of an inner power control loop being unable to achieve the SIR as quickly as the outer power control loop can change the SIR target value.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1A–8 of the drawings, like numerals being used for like and corresponding parts of the various drawings.

Essentially, in accordance with a preferred embodiment of the present invention, a transmission power control method and system are provided for use in a spread spectrum or CDMA mobile communications system, whereby an estimate of the actually achieved SIR (or a filtered version) is used as an additional parameter for the outer power control loop function. When the QoS and achieved SIR are both too low, the QoS is ignored and the SIR target value is instead controlled by the achieved SIR. Similarly, when both the QoS and achieved SIR are too high, the QoS is ignored and the SIR target value is instead controlled by the achieved SIR.

Figure 3:
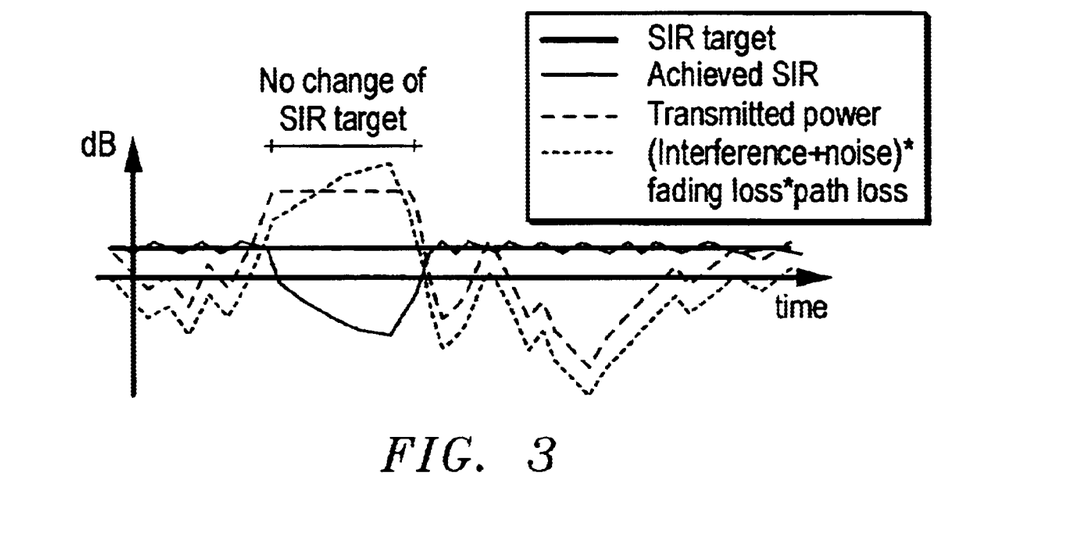
FIG. 3 is a diagram that illustrates the SIR target value being controlled by QoS parameters and the difference between the SIR target value and the actually achieved SIR, in accordance with a preferred embodiment of the present invention.
Figure 4:
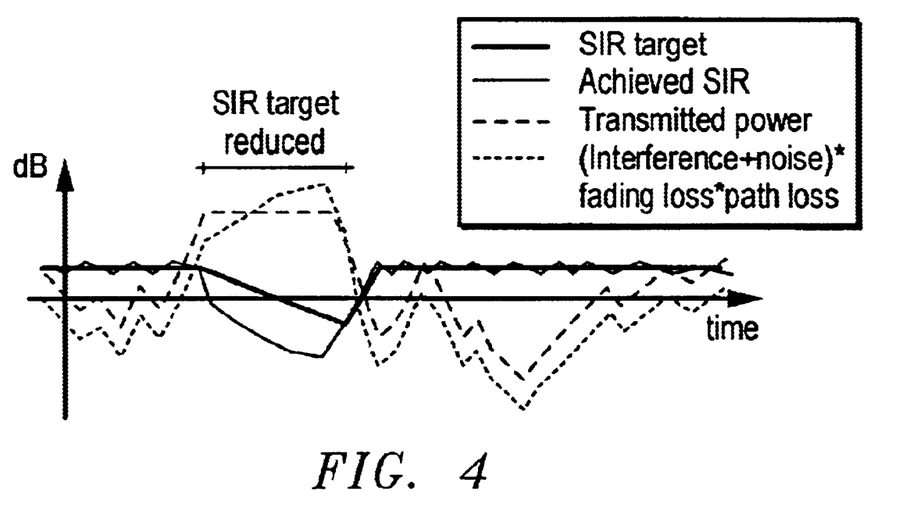
FIG. 4 is a diagram that illustrates the SIR target value again being controlled by QoS parameters and the difference between the SIR target value and the actually achieved SIR, in accordance with the preferred embodiment of the present invention.

During these periods when both the QoS and achieved SIR are simultaneously either too high or too low, the SIR target value can be changed at a lower rate by the outer loop, held constant (as illustrated in FIG. 3), or changed in the direction opposite to what it would have been changed to had the outer loop responded to the QoS only (as illustrated in FIG. 4). For example, as shown in FIG. 3, the SIR target value is being controlled by QoS parameters and the difference between the SIR target value and the actually achieved SIR. In accordance with the preferred embodiment of the present invention, no change of the SIR target value is applied when the inner loop is unable to achieve the SIR target value. Consequently, no unnecessarily high levels of power are being transmitted. Similarly, as shown in FIG. 4, the SIR target value is again being controlled by QoS parameters and the difference between the SIR target value and the actually achieved SIR. Notably, a proposed increase of the SIR means that the QoS is too low and vice versa. In accordance with the preferred embodiment, the SIR target value is changed in the direction of the achieved SIR when the inner loop is unable to achieve the SIR target value. In this case, no unnecessarily high levels of power are transmitted, and the operation of the inner loop is begun slowly after the transmit power limitation is taken away.

On the other hand, due to certain design considerations, the approach to be used for SIR target control can be different when the QoS is too low or too high. In order to keep the transmitted power level as low as possible at all times, the outer loop can, for example, hold the SIR target value constant when both the QoS and achieved SIR are too high, and lower the SIR target value when both the QoS and achieved SIR are too low. With this approach, the transmitted power level will be forced to increase slowly after a maximum power limitation situation. However, the transmitted power level will decrease quickly after a minimum power limitation situation.

Figure 5A:
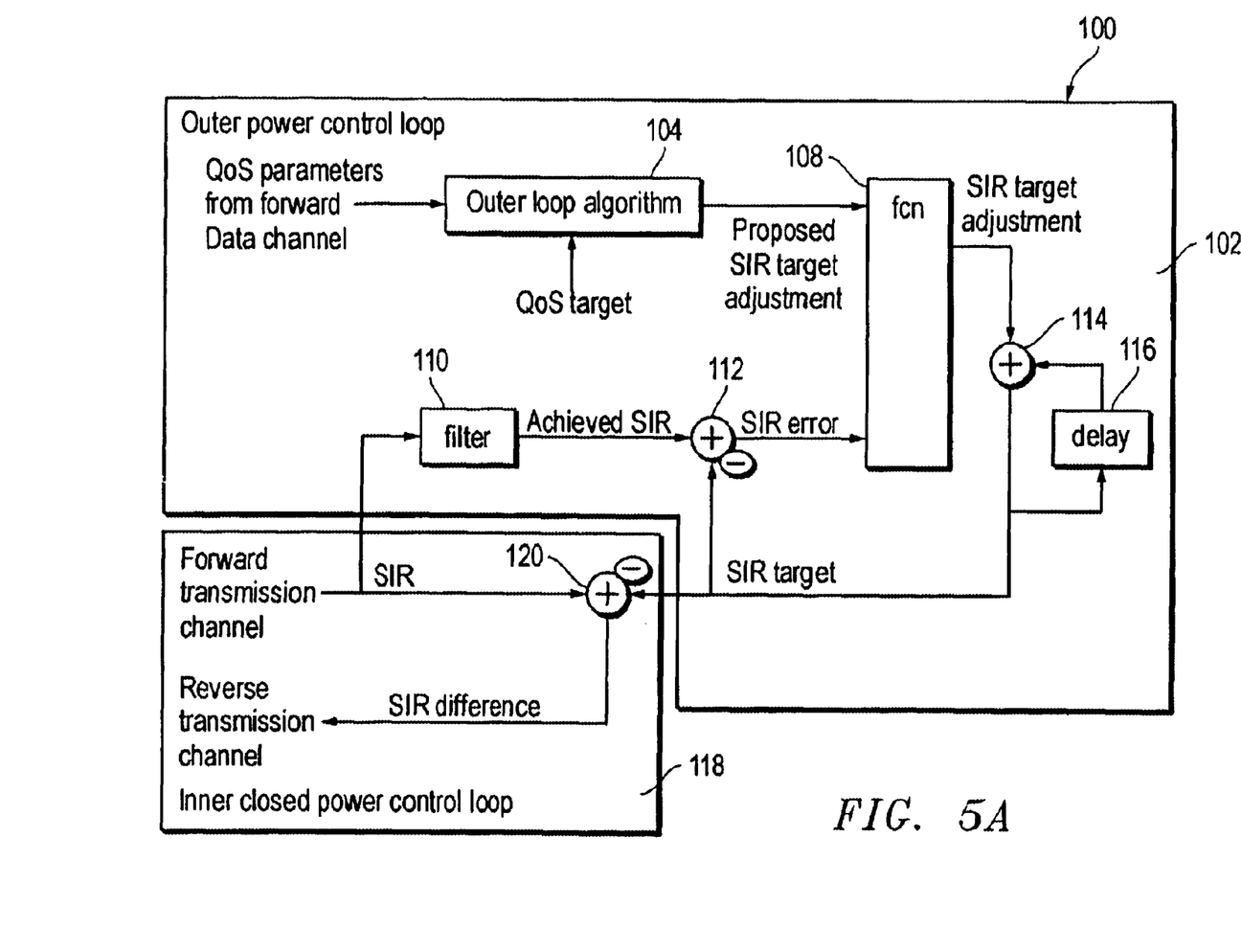
FIG. 5A is a block diagram of an exemplary power control loop system that can be used to implement the preferred embodiment of the present invention.

Specifically, FIG. 5A is a block diagram of an exemplary power control loop system 100 that can be used to implement the preferred embodiment of the present invention, for example, on the downlink. Note that the exemplary power control system 100 shown can be implemented in a base station or a mobile station. For illustrative purposes only, it can be assumed that the power control system 100 shown can be implemented as software and/or hardware in a mobile station of a spread spectrum or CDMA cellular system. As such, the outer power control loop 102 includes an outer loop algorithm 104, which receives QoS parameters from the forward (downlink) data channel. Exemplary outer loop algorithms, which can be used to implement the present invention, are described below with respect to FIGS. 6A, 6B, 7 and 8. The output of the outer loop algorithm 104 is a proposed SIR target adjustment value, which is coupled to an input of a function generator 108.

A filter 110 receives the actually achieved SIR information measured on the forward transmission channel. Essentially, the filter 110 computes the mean of the actually achieved SIR information for the time period elapsed since the SIR target value was last updated. The filter 110 can be implemented, for example, with an IIR filter, a FIR filter, or an accumulator which is reset when the SIR target value is adjusted. The output of the filter 110 is connected to an adder 112, which algebraically adds the (negative of the) current SIR target value to the actually achieved SIR to produce a SIR error value. The function generator 108 generates a SIR target adjustment signal, which is a function (fcn) of the combined proposed SIR target adjustment value and SIR error value. An adder 114 and delay 116 are combined to form an integrator, which integrates the SIR target S adjustment signal to produce the above-described SIR target value. In other words, the outer loop algorithm 104 (and other similar outer loop algorithms) add(s) an adjustment value to the SIR target value. As such, the adjustment value is added to the previously-computed SIR target value in order to drive the new SIR target value in the desired direction. Depending upon the particular outer loop algorithm used, the adjustment values can be computed for each frame, for each predetermined number of frames, or for an irregular number of frames.

A portion of an inner closed power control loop 118 is shown (e.g., on the downlink) which includes a third adder 120. The actually achieved SIR received from the forward transmission (downlink) channel is algebraically added (120) to the (negative of the) SIR target value from the outer power control loop 102 to produce a SIR difference value. The mobile station (not shown) transmits the SIR difference value to a serving base station (not shown) on the reverse (uplink) transmission channel.

Figure 5B:
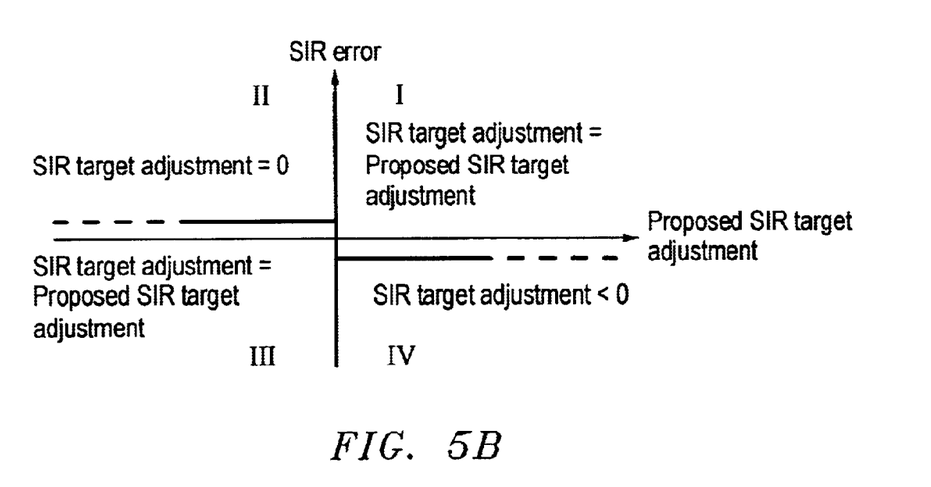
FIG. 5B is a diagram that illustrates an exemplary implementation of an outer power control loop function, fcn, in the outer power control loop shown in FIG. 5A.

FIG. 5B is a diagram that illustrates an exemplary implementation of the outer power control loop function, fcn (108), in the outer power control loop 102 shown in FIG. 5A. As described above, the SIR target adjustment signal is controlled by fcn, which is a function of the proposed SIR target adjustment value and the SIR error value. Essentially, as mentioned earlier, a proposed increase of the SIR means a too low QoS and vice versa. As illustrated by FIG. 5B, when the SIR error is close to zero, the outer loop 102 operates as a quality control loop which increases the SIR target value when the QoS is too low, and decreases the SIR target value when the QoS is too high. The outer loop 102 operates in the same manner when the QoS is too low while the actually achieved SIR is above the SIR target value, or when the QoS is too high while the actually achieved SIR is below the SIR target value. In other words, the SIR target value is controlled by the QoS in the areas I and III shown in FIG. 5B.

As for what the areas II and IV shown in FIG. 5B are meant to illustrate, the inner loop 118 has been unable to adjust the achieved SIR to within a close vicinity of the SIR target value. For example, as shown in area II, the QoS is too high and the SIR target value is held constant, which allows the inner loop 118 to lower the transmitted power level as rapidly as possible when the limitation on the inner loop disappears. However, as shown in area IV, the output power increases slowly at the outer loop's speed, after a situation in which both the actually achieved SIR and QoS were too low, when the limitation on the inner loop disappears.

Figure 6A:
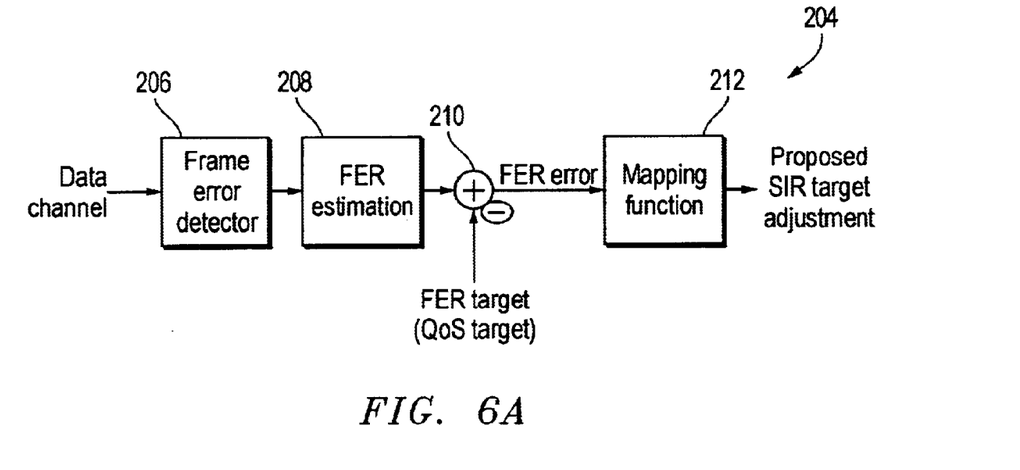
FIG. 6A is a block diagram of an exemplary outer loop algorithm which can be used to implement the outer loop algorithm shown in FIG. 5A, in accordance with an embodiment of the present invention.

FIG. 6A is a block diagram of an exemplary outer loop algorithm 204 (in functional form) which can be used to implement the outer loop algorithm 104 shown in FIG. 5A, in accordance with an embodiment of the present invention. Essentially, the outer loop algorithm 104 or 204 (and similar algorithms) functions to receive a stream of error marks (e.g., indications about whether or not the cyclical redundancy check or CRC for the received data was successful) and a QoS target value. The input statistics from the data channel can also include BER estimates from a forward error correcting decoder and/or other quality estimation information. In accordance with the present invention, the outer loop algorithm used produces a proposed SIR target adjustment value. The prior algorithms used the proposed SIR target adjustment value as the actual SIR target adjustment value. Also, in accordance with the present invention, the SIR error is also used to determine the actual SIR target value.

Figure 6B:
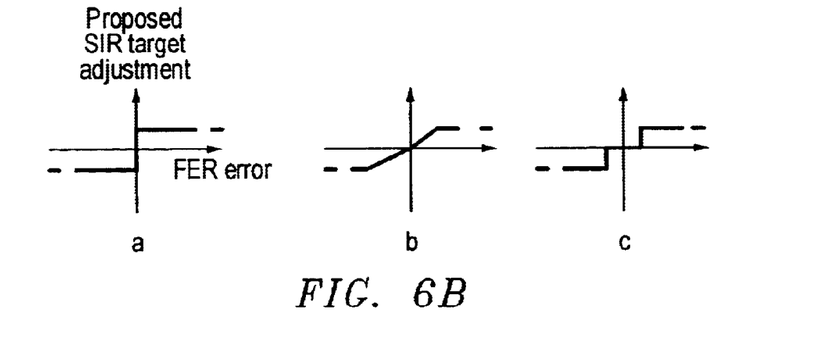
FIG. 6B is a diagram that illustrates examples of different mapping functions for the outer loop algorithm shown in FIG. 6A.

Specifically, referring to FIG. 6A, the exemplary outer loop algorithm 204 includes a frame error detector 206, which detects whether a frame error has occurred (e.g., from the stream of error marks received from the data channel). The output of the frame error detector is coupled to an input of a FER estimator 208, which produces an estimate of the FER for some period of time, variable or predetermined. The estimated FER value (208) is algebraically added to (the negative of) a FER target value (e.g., QoS target value) to produce a FER error value. The FER error from the adder 210 is coupled to an input of a mapper 212, which maps (e.g., using a table in a database) an input FER error value to a proposed SIR target adjustment value. Three examples (a, b, c) of different mapping functions for the outer loop algorithm 204 are shown in FIG. 6B.

Figure 7:
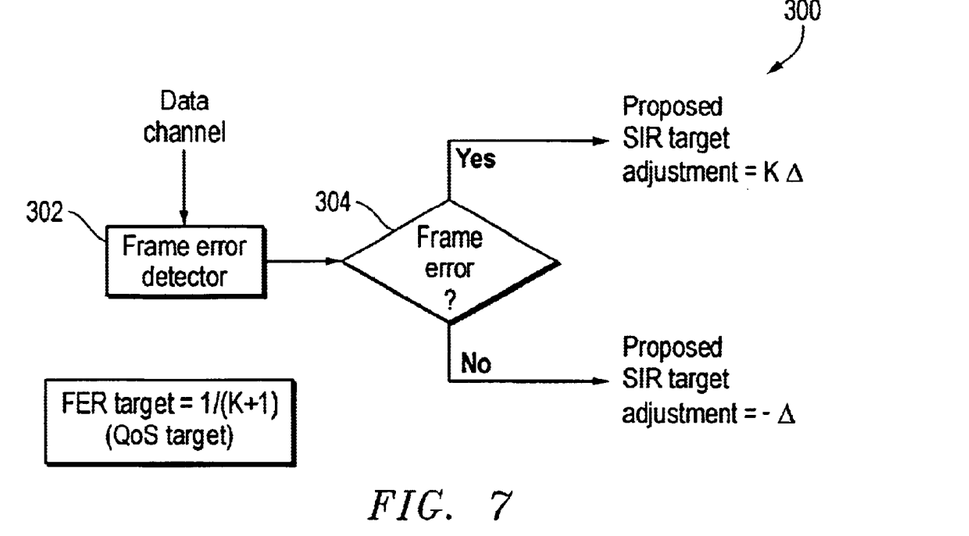
FIG. 7 is a flow diagram of a second exemplary method that can be used to implement the outer loop algorithm shown in FIG. 5A.

FIG. 7 is a flow diagram of a second exemplary method 300 that can be used to implement the outer loop algorithm 104 shown in FIG. 5A. As shown, if the frame error detector 302 (206 in FIG. 6A) determines that a frame error has occurred, at step 304, the output of the outer loop algorithm 104 (proposed SIR target adjustment value) is made equal to K$\Delta$ (where the input FER target value is equal to 1/(K+1)). Otherwise, at step 304, if no frame error has been detected, the output of the outer loop algorithm 104 is made equal to $-\Delta$.

Figure 8:
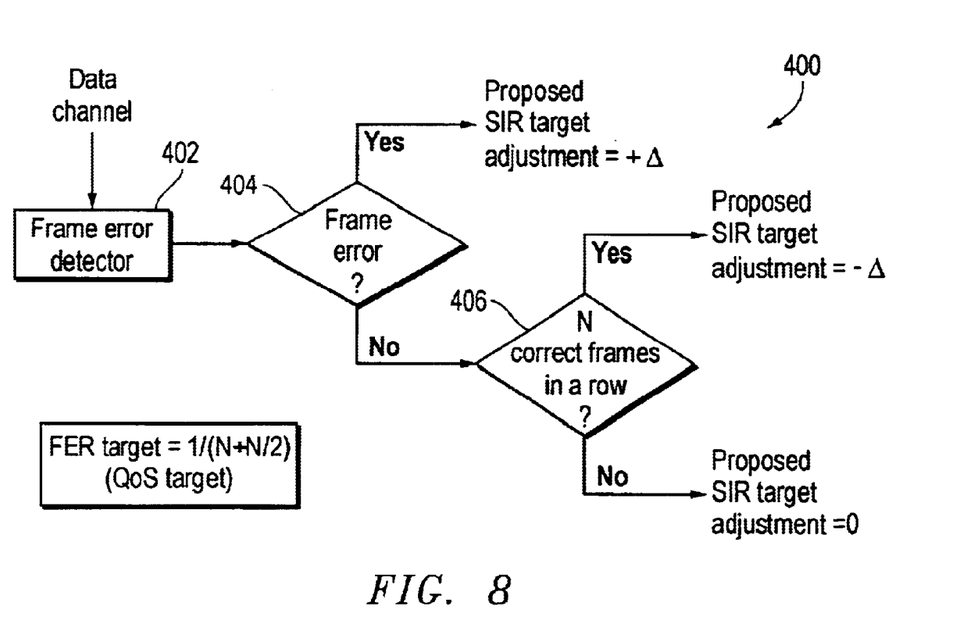
FIG. 8 is a flow diagram of a third exemplary method that can be used to implement the outer loop algorithm shown in FIG. 5A.

FIG. 8 is a flow diagram of a third exemplary method 400 that can be used to implement the outer loop algorithm 104 shown in FIG. 5A. As shown, if the frame error detector 402 (206 in FIG. 6A) determines that a frame error has occurred, at step 404, the output of the outer loop algorithm 104 (proposed SIR target adjustment value) is made equal to $+\Delta$ (where the input FER target value is equal to 1/(N+N/2)). Otherwise, at step 404, if no frame error has been detected, at step 406, the frame error detector 402 determines whether there have been N correct frames in a row. If so, at step 406, the output of the outer loop algorithm 104 is made equal to $-\Delta$. Otherwise, at step 406, if there have not been N correct frames in a row, the proposed SIR target adjustment value is made equal to zero.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A power control loop for a spread spectrum mobile communications system, comprising:
   an outer loop power controller for generating a proposed signal-to-interference ratio target adjustment signal;
   a comparer for comparing a signal-to-interference ratio target signal and an achieved signal-to-interference ratio signal and generating a signal-to-interference ratio error signal therefrom; and
   a function generator for generating a signal-to-interference ratio target adjustment signal as a function of a combination of said proposed signal-to-interference ratio target adjustment signal and said signal-to-interference ratio error signal, wherein said signal-to-interference ratio target signal is generated from said signal-to-interference ratio target adjustment signal.

2. The power control loop of claim 1, wherein said spread spectrum mobile communications system comprises a CDMA cellular system.

3. The power control loop of claim 1, wherein said spread spectrum mobile communications system comprises a WCDMA cellular system.

4. The power control loop of claim 1, further comprising an integrator for generating said signal-to-interference ratio target signal from said signal-to-interference ratio target adjustment signal.

5. The power control loop of claim 4, wherein said integrator comprises an adder and a delay.

6. The power control loop of claim 1, wherein said comparer for generating said signal-to-interference ratio error signal comprises:
   a filter coupled to a forward transmission channel for generating said achieved signal-to-interference ratio signal; and
   an adder coupled to an output of said filter for subtracting said signal-to-interference target signal from the achieved signal-to-interference ratio signal and generating the signal-to-interference ratio error signal.

7. The power control loop of claim 1, wherein said comparer compares a current signal-to-interference ratio target signal with said achieved signal-to-interference ratio signal to generate said signal-to-interference ratio error signal, further comprising:
   a signal-to-interference ratio target generator, coupled to the function generator and the comparer, for generating a new signal-to-interference ratio target signal based, at least in part, on the signal-to-interference ratio target adjustment signal and a previously computed signal-to-interference ratio target signal.

8. The power control loop of claim 1, wherein the function generator selectively generates a value of the signal-to-interference ratio target adjustment signal to be equal to a value of the proposed signal-to-interference ratio target adjustment signal when the signal-to-interference ratio error value is substantially equal to zero.

9. The power control loop of claim 7, further comprising an inner power control loop coupled to the signal-to-interference ratio target generator, the inner power control loop configured to receive the new signal-to-interference ratio target signal and to initiate power adjustments in response to a difference between the new signal-to-interference ratio target signal and the achieved signal-to-interference ratio signal.

10. The power control loop of claim 1, wherein the function generator selectively generates a value of the signal-to-interference ratio target adjustment signal to be equal to zero when the signal-to-interference ratio error signal is above a selected threshold and the proposed signal-to-interference ratio target adjustment signal is negative.

11. The power control loop of claim 1, wherein the function generator selectively generates a value of the signal-to-interference ratio target adjustment signal to be negative when the signal-to-interference ratio error signal is below a selected threshold and the proposed signal-to-interference ratio target adjustment signal is positive.

12. The power control loop of claim 1, wherein the proposed signal-to-interference ratio target adjustment signal comprises a quality of service measurement.

13. The power control loop of claim 1, wherein the function generator selectively lowers the signal-to-interference ratio target adjustment signal in order for the signal-to-interference target signal generated therefrom to be equal to the achieved signal-to-interference ratio signal, thereby the signal-to-interference ratio error signal is substantially zero.

14. The power control loop of claim 1, wherein said function generator prevents an increase in the signal-to-interference ratio target signal unless there is an increase in a quality of service parameter of the power control loop.

15. The power control loop of claim 1, wherein the outer loop power controller comprises:
   an error detector for detecting whether an error has occurred in a transmission data channel;
   a combiner coupled to said error detector, for generating an error rate error value; and
   a mapper coupled to said combiner, for generating the proposed signal-to-interference ratio target adjustment signal by mapping said error rate error value to the proposed signal-to-interference ratio target adjustment signal.

16. The power control loop of claim 15, further comprising an error rate estimator coupled to an output of said error detector, for estimating an error rate if a plurality of errors have occurred in said transmission data channel.

17. The power control loop of claim 15, wherein said error detector comprises a frame error detector.

18. The power control loop of claim 16, wherein said error rate estimator comprises a frame error rate estimator.

19. The power control loop of claim 15, wherein said combiner comprises an adder.

20. The power control loop of claim 1, wherein said proposed signal-to-interference ratio target adjustment signal comprises a proposed signal-to-noise ratio (SNR) target adjustment value.

21. A power control method for a spread spectrum mobile communications system, comprising the steps of:
   generating a proposed signal-to-interference ratio target adjustment signal;
   comparing a signal-to-interference ratio target signal and an achieved signal-to-interference ratio signal;
   generating a signal-to-interference ratio error signal based on the comparison of the signal-to-interference ratio target signal and the achieved signal-to-interference ratio signal; and
   generating a signal-to-interference ratio target adjustment signal as a function of a combination of said proposed signal-to-interference ratio target adjustment signal and said signal-to-interference ratio error signal, wherein said signal-to-interference ratio target signal is generated from said signal-to-interference ratio target adjustment signal.

22. The power control method of claim 21, wherein said spread spectrum mobile communications system comprises a CDMA cellular system.

23. The power control method of claim 21, wherein said spread spectrum mobile communications system comprises a WCDMA cellular system.

24. The power control method of claim 21, wherein said step of generating said signal-to-interference ratio error signal comprises:

filtering a signal-to-interference ratio signal from a forward transmission channel to generate said achieved signal-to-interference ratio signal; and subtracting said signal-to-interference ratio target signal from said achieved signal-to-interference signal to generate the signal-to-interference ratio error signal.

25. The power control method of claim 21, wherein the step of generating the proposed signal-to-interference ratio target adjustment signal comprises comparing a measured quality parameter with a target quality parameter.

26. The power control method of claim 21, wherein the step of generating the signal-to-interference ratio error signal comprises comparing a current signal-to-interference ratio target signal with an achieved signal-to-interference ratio signal, further comprising generating a new signal-to-interference target signal based, at least in part, on the signal-to-interference ratio target adjustment signal and a previously computed signal-to-interference ratio target signal.

27. The power control method of claim 26, further comprising the step of initiating power adjustments in response to a difference between the new signal-to-interference ratio target signal and the achieved signal-to-interference ratio signal, the step of initiating performed using an inner power control loop.

28. The power control method of claim 21, wherein the step of generating a signal-to-interference ratio target adjustment signal comprises generating a value of the signal-to-interference ratio target adjustment signal to be equal to zero when the signal-to-interference ratio error signal is above a selected threshold and the proposed signal-to-interference ratio target adjustment signal is negative.

29. The power control method of claim 21, wherein the step of generating a signal-to-interference ratio target adjustment signal comprises generating a value of the signal-to-interference ratio error signal to be negative when the signal-to-interference ratio error signal is below a selected threshold and the proposed signal-to-interference ratio target adjustment signal is positive.

30. The power control method of claim 21, wherein the step of generating the proposed signal-to-interference ratio target adjustment signal comprises generating the proposed signal-to-interference ratio target adjustment signal based on a quality of service measurement.

31. The power control method of claim 21, further comprising the step of:

selectively lowering the signal-to-interference ratio target adjustment signal in order for the signal-to-interference target signal generated therefrom to be equal to the achieved signal-to-interference ratio signal, thereby the signal-to-interference ratio error signal is substantially zero.

32. The power control method of claim 21, further comprising the step of:

preventing an increase in the signal-to-interference ratio target signal unless there is an increase in a quality of service parameter.

33. The power control method of claim 21, wherein said step of generating a proposed signal-to-interference ratio target adjustment signal comprises the steps of:

detecting whether an error has occurred in a transmission data channel;

generating an error rate error value; and generating the proposed signal-to-interference ratio target adjustment signal by mapping said error rate error value to the proposed signal-to-interference ratio target adjustment signal.

34. The power control method of claim 33, further comprising the step of estimating an error rate if a plurality of errors have occurred in said transmission data channel.

35. The power control method of claim 33, wherein said detecting step is performed with a frame error detector.

36. The power control method of claim 34, wherein said estimating step is performed with a frame error rate estimator.

37. The power control method of claim 33, wherein said combining step is performed with an adder.

38. The power control method of claim 21, wherein said proposed signal-to-interference ratio target adjustment signal comprises a proposed SNR target adjustment value.

* * * * *